United States Patent
Lam

(10) Patent No.: US 9,372,775 B1
(45) Date of Patent: *Jun. 21, 2016

(54) METHOD AND APPARATUS FOR PROVIDING AT RISK INFORMATION IN A CLOUD COMPUTING SYSTEM HAVING REDUNDANCY

(71) Applicant: EMC Corporation, Hopkinton, MA (US)

(72) Inventor: Cheuk Lam, Yorktown Heights, NY (US)

(73) Assignee: EMC CORPORATION, Hopkinton, MA (US)

( * ) Notice: Subject to any disclaimer, the term of this patent is extended or adjusted under 35 U.S.C. 154(b) by 105 days.

This patent is subject to a terminal disclaimer.

(21) Appl. No.: 14/483,249

(22) Filed: Sep. 11, 2014

Related U.S. Application Data

(63) Continuation of application No. 13/536,422, filed on Jun. 28, 2012, now Pat. No. 8,862,948.

(51) Int. Cl.
  *G06F 11/00* (2006.01)
  *G06F 11/34* (2006.01)
  *G06F 11/16* (2006.01)

(52) U.S. Cl.
  CPC ........ *G06F 11/3409* (2013.01); *G06F 11/1666* (2013.01)

(58) Field of Classification Search
  CPC .............. G06F 11/008; G06F 11/1666; G06F 11/3409; G06F 11/3442; G06F 11/3447
  See application file for complete search history.

(56) References Cited

U.S. PATENT DOCUMENTS

| | | | | |
|---|---|---|---|---|
| 7,426,554 B2* | 9/2008 | Kennedy | | H04L 41/069 709/223 |
| 7,539,907 B1* | 5/2009 | Johnsen | | G06F 11/008 714/26 |
| 7,580,956 B1* | 8/2009 | Xin | | G06F 17/30067 |
| 8,346,694 B2* | 1/2013 | Dugan | | G06Q 10/0635 706/45 |
| 8,862,948 B1* | 10/2014 | Lam | | G06F 11/008 714/26 |
| 2002/0174384 A1* | 11/2002 | Graichen | | G06F 11/008 714/37 |
| 2003/0034995 A1* | 2/2003 | Osborn | | G06F 3/0481 715/713 |
| 2003/0204788 A1* | 10/2003 | Smith | | G06F 11/008 714/47.3 |

(Continued)

OTHER PUBLICATIONS

U.S. Appl. No. 13/536,422, Office Action dated Apr. 7, 2014, 11 pages.

(Continued)

*Primary Examiner* — Marc Duncan
(74) *Attorney, Agent, or Firm* — Daly, Crowley Mofford & Durkee LLP

(57) ABSTRACT

Methods and apparatus for generating at risk probabilities for a pre-integrated cloud computing system. In one embodiment, a system determines a revised overall risk index after at least two component failures in at least two of the compute domain, storage domain, and storage paths to assist a user in selecting a first one of the at least two component failures to fix first.

15 Claims, 8 Drawing Sheets

(56) References Cited

U.S. PATENT DOCUMENTS

| | | | | |
|---|---|---|---|---|
| 2004/0230548 A1* | 11/2004 | Wookey | G06F 11/008 | 706/47 |
| 2005/0102547 A1* | 5/2005 | Keeton | G06F 11/008 | 714/1 |
| 2009/0024425 A1* | 1/2009 | Calvert | G06Q 10/06 | 705/7.25 |
| 2009/0138306 A1* | 5/2009 | Coburn | G06Q 10/0635 | 705/7.28 |
| 2009/0150711 A1* | 6/2009 | Kami | G06F 11/008 | 714/1 |
| 2009/0177927 A1* | 7/2009 | Bailey | G06F 11/008 | 714/37 |
| 2010/0042451 A1* | 2/2010 | Howell | G06F 11/008 | 705/7.28 |
| 2010/0114634 A1* | 5/2010 | Christiansen | G06Q 10/06 | 705/7.28 |
| 2011/0125548 A1* | 5/2011 | Aharon | G01Q 10/04 | 705/7.28 |
| 2011/0214183 A1* | 9/2011 | Fudge | G06F 11/008 | 726/23 |
| 2011/0283146 A1* | 11/2011 | Nemecek | G06F 11/008 | 714/37 |
| 2013/0212422 A1* | 8/2013 | Bauer | H04L 67/1097 | 714/4.1 |
| 2013/0219230 A1* | 8/2013 | Best | G06F 11/008 | 714/47.3 |
| 2014/0047271 A1* | 2/2014 | Gray | G05B 23/0251 | 714/25 |

OTHER PUBLICATIONS

U.S. Appl. No. 13/536,422, Response to Office Action filed May 22, 2014, 11 pages.

U.S. Appl. No. 13/536,422, Notice of Allowance dated Jun. 12, 2014, 5 pages.

U.S. Appl. No. 13/536,422.

U.S. Appl. No. 13/536,422, filed Jun. 28, 2012, Lam.

\* cited by examiner

METHOD AND APPARATUS FOR PROVIDING AT RISK INFORMATION IN A CLOUD COMPUTING SYSTEM HAVING REDUNDANCY

CROSS-REFERENCE TO RELATED APPLICATIONS

This application is a continuation of U.S. patent application Ser. No. 13/536,442 filed on Jun. 28, 2012, entitled: METHOD AND APPARATUS FOR PROVIDING AT RISK INFORMATION IN A CLOUD COMPUTING SYSTEM HAVING REDUNDANCY which is incorporated herein by reference in its entirety.

BACKGROUND

As is known in the art, cloud computing systems contain a large number of hardware devices, components, software applications, and modules. For example, cloud computing systems can include integrated compute, network, and storage domains. In typical systems, redundancy is built into each domain to ensure services are not disrupted because of hardware failures. For example, two fabrics and two switches provide multiple paths for each server blade to get to network or storage resources. In the storage domain, RAID technology with hot spare disks prevents data loss due to disk failures.

Traditionally, the redundancy on a group of resources has been measured using a fractional threshold, e.g., 2 out of 4 links are down. One example of using this method is the analytic model in the EMC ITOI SMARTS domain manager. In other known systems, redundancy is classified into categories, such as redundancy lost, redundancy degraded, etc., based on the number of available resources. A classification of this type appears in some VMware vCenter events such as storage path redundancy events. Some conventional systems use analytics that measure risk by predicting the headroom in terms of capacity. This technology is being used in the VMware Capacity IQ, for example. However, this concerns a different aspect of resources, namely, capacity, but not redundancy or availability.

SUMMARY

In one aspect of the invention, a method comprises: in a pre-integrated cloud computing system having a compute domain, a network domain, a storage domain, a virtual layer and a management layer, to provide services, the cloud computing system providing redundancy, determining an at risk probability in the compute domain, determining an at risk probability for storage volumes in the storage domain, determining an at risk probability for storage paths to the storage domain from the compute domain, and determining an overall at risk probability for a first one of the services using system resources.

The method can further include one or more of the following features: providing an overall risk index for the first one of the services from the overall risk probability, using a logarithm to generate the overall risk index, the at risk probability for the compute domain is derived from a number of blades used by the first one of the services, a failover rate relating to a number of servers that can fail without putting a compute cluster service into an overcommitted state, an annual failure rate for the blades used by the first one of the services, and an amount of time to replace one of the blades used by the first one of the services, the at risk probability for the storage volumes is derived from a number of storage volumes used by the first one of the services, a number of disks in the storage volumes, a number of disks that can fail in the storage volumes without data loss, an annual disk failure rate, and an amount of time needed to convert a hot spare disk to a contributing disk of the storage volume, the at risk probability for the storage paths is derived from a number of storage volumes used by the first one of the services, a number of blades used by the first one of the services, a number of cables used by the storage volumes, an annual failure rate for the cables, and an amount of time to replace a failed one of the cables, determining a revised overall risk index after one or more component failures, and/or determining a first risk index from the at risk probability in the compute domain, determining a second risk index from the at risk probability for storage volumes in the storage domain, determining a third risk index from the at risk probability for storage paths to the storage domain from the compute domain, and generating a revised first, second, third risk index for one or more component failures to assist a user in selecting a first one of the one or more components to fix first.

In another aspect of the invention, an article comprises: a computer readable medium containing non-transitory stored instructions that enable a machine to perform, in a pre integrated cloud computing system having a compute domain, a network domain, a storage domain, a virtual layer and a management layer, to provide services, the cloud computing system providing redundancy, determining an at risk probability in the compute domain, determining an at risk probability for storage volumes in the storage domain, determining an at risk probability for storage paths to the storage domain from the compute domain, and determining an overall at risk probability for a first one of the services using system resources.

The article can further include one or more of the following features: instructions for providing an overall risk index for the first one of the services from the overall risk probability, instructions for using a logarithm to generate the overall risk index, the at risk probability for the compute domain is derived from a number of blades used by the first one of the services, a failover rate relating to a number of servers that can fail without putting a compute cluster service into an overcommitted state, an annual failure rate for the blades used by the first one of the services, and an amount of time to replace one of the blades used by the first one of the services, the at risk probability for the storage volumes is derived from a number of storage volumes used by the first one of the services, a number of disks in the storage volumes, a number of disks that can fail in the storage volumes without data loss, an annual disk failure rate, and an amount of time needed to convert a hot spare disk to a contributing disk of the storage volume, the at risk probability for the storage paths is derived from a number of storage volumes used by the first one of the services, a number of blades used by the first one of the services, a number of cables used by the storage volumes, an annual failure rate for the cables, and an amount of time to replace a failed one of the cables, including instructions for determining a revised overall risk index after one or more component failures, and/or instructions for determining a first risk index from the at risk probability in the compute domain, determining a second risk index from the at risk probability for storage volumes in the storage domain, determining a third risk index from the at risk probability for storage paths to the storage domain from the compute domain, and generating a revised first, second, third risk index for one or more component failures to assist a user in selecting a first one of the one or more components to fix first.

In a further aspect of the invention, a pre-integrated cloud computing system having a compute domain, a network domain, a storage domain, a virtual layer and a management layer, to provide services, the cloud computing system providing redundancy, comprises: a processor, and a memory containing instructions to enable the processor to: determine an at risk probability in the compute domain, determine an at risk probability for storage volumes in the storage domain, determine an at risk probability for storage paths to the storage domain from the compute domain, and determine an overall at risk probability for a first one of the services using system resources.

BRIEF DESCRIPTION OF THE DRAWINGS

The foregoing features of this invention, as well as the invention itself, may be more fully understood from the following description of the drawings in which.

DETAILED DESCRIPTION

Figure 1:
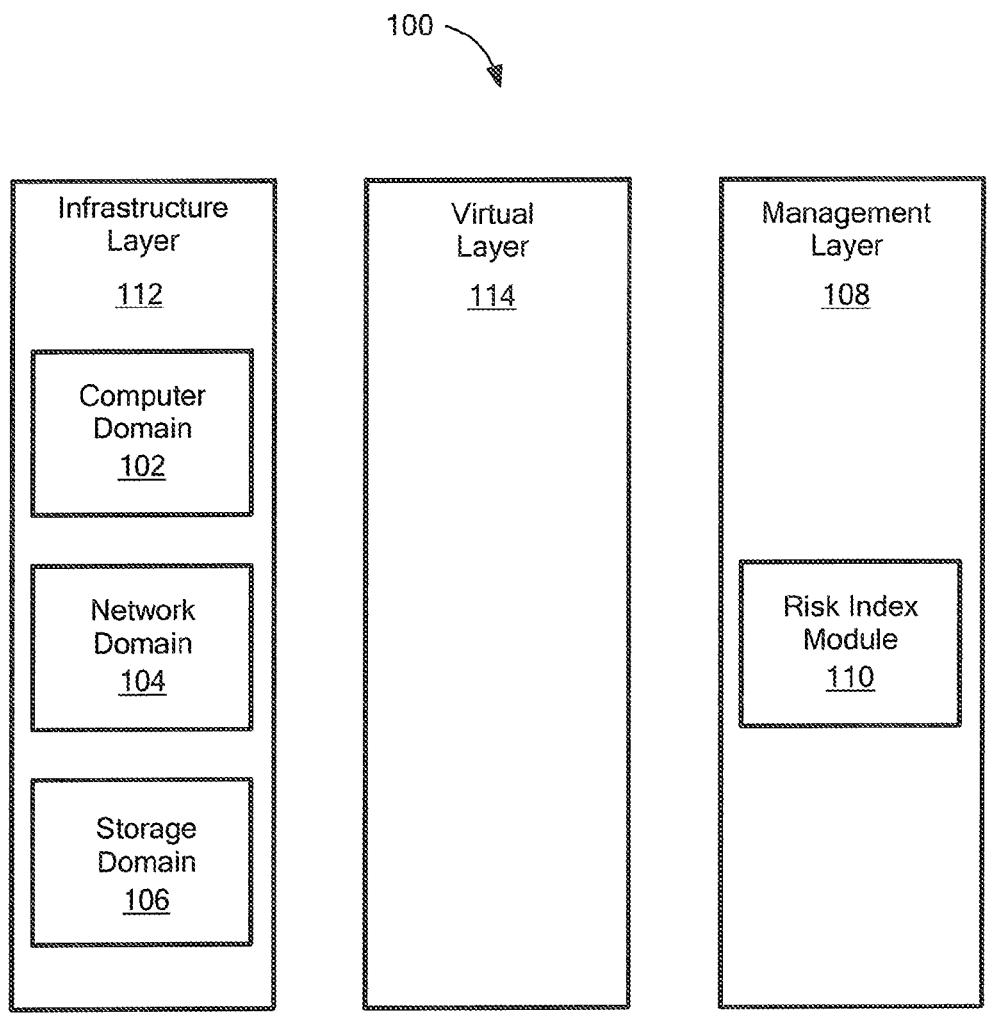
FIG. 1 is a high level schematic representation of a pre-integrated cloud computing system having a risk index in accordance with exemplary embodiments of the invention.

FIG. 1 shows an exemplary cloud computing environment 100 having a redundancy risk index in accordance with exemplary embodiments of the invention. The environment includes an infrastructure layer 112, a virtual layer 114 and a management layer 108. The infrastructure layer is further divided into a compute domain 102, a network domain 104, and a storage domain 106. The management layer 108 contains a risk index module 110, which is described more fully below. The environment may be referred to as a platform. It is understood that any practical number of platforms can be combined into a cloud storage environment. It is further understood that the risk index module 110 can be provided in any practical location within the system.

The compute domain 102 comprises components, such as blade servers, chassis and fabric interconnects that provide the computing power for the platform. The storage domain 106 comprises the storage components for the platform. The network domain 104 comprises the components that provide switching and routing between the compute and storage domains 102, 106 within and between platforms, and to the client or customer network.

Figure 2:
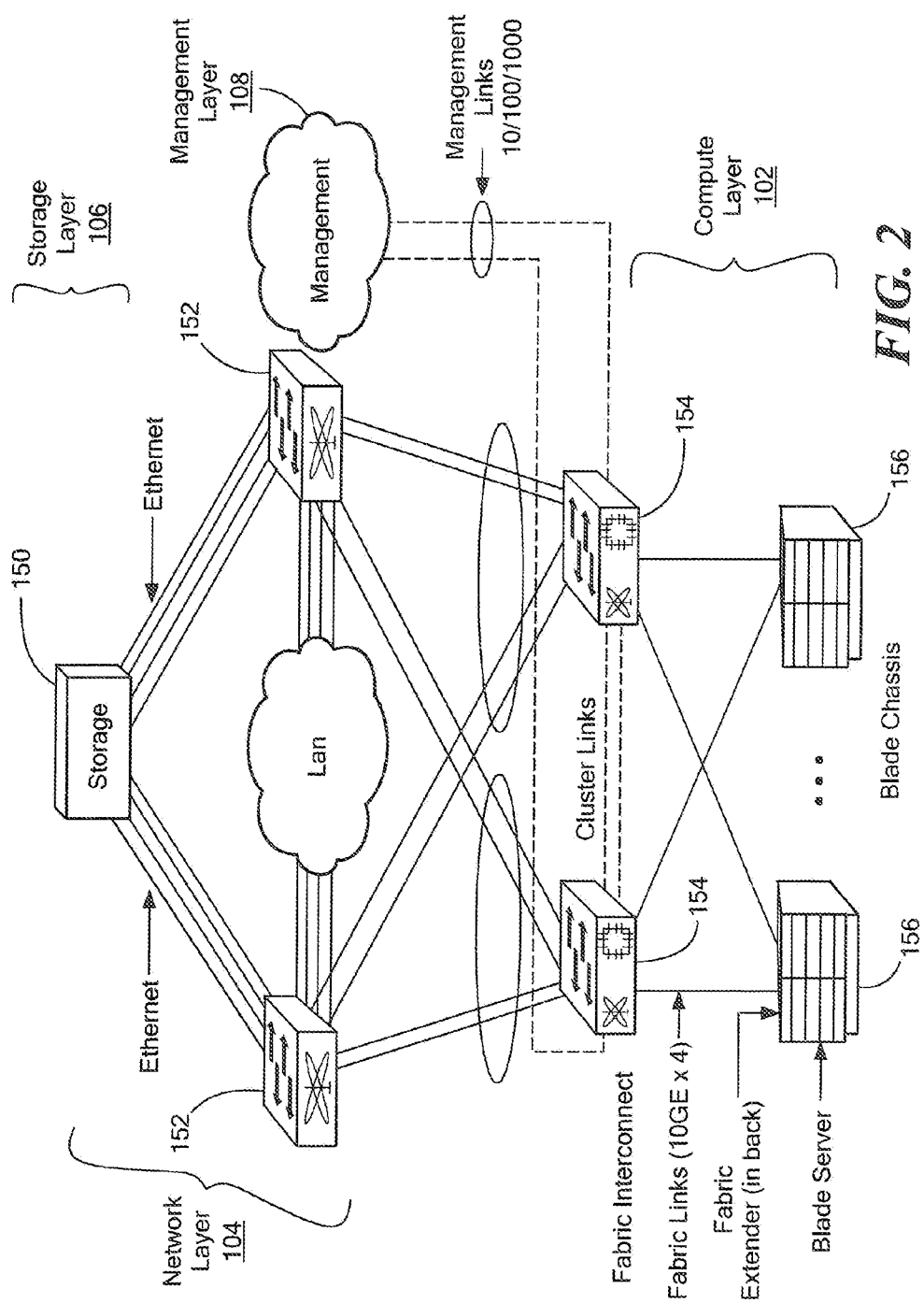
FIG. 2 is a schematic representation showing further detail of the pre-integrated cloud computing system of FIG. 1 including interconnections.

FIG. 2 shows further detail for the environment 100 of FIG. 1. The storage domain 106 can include storage components 150, such as CLARIION storage components from EMC Corporation of Hopkinton Mass. The network domain 104 can include a pair of switches 152, such as MDS 9000 Series Multilayer SAN Switches from Cisco of San Jose, Calif., coupled to the storage components and to a LAN. The compute domain 102 can include a pair of fabric interconnects 154, such as CISCO 6100 series devices. The compute domain can further include a number of blade servers 156, such as CISCO 5100 blade chassis.

Figure 3:
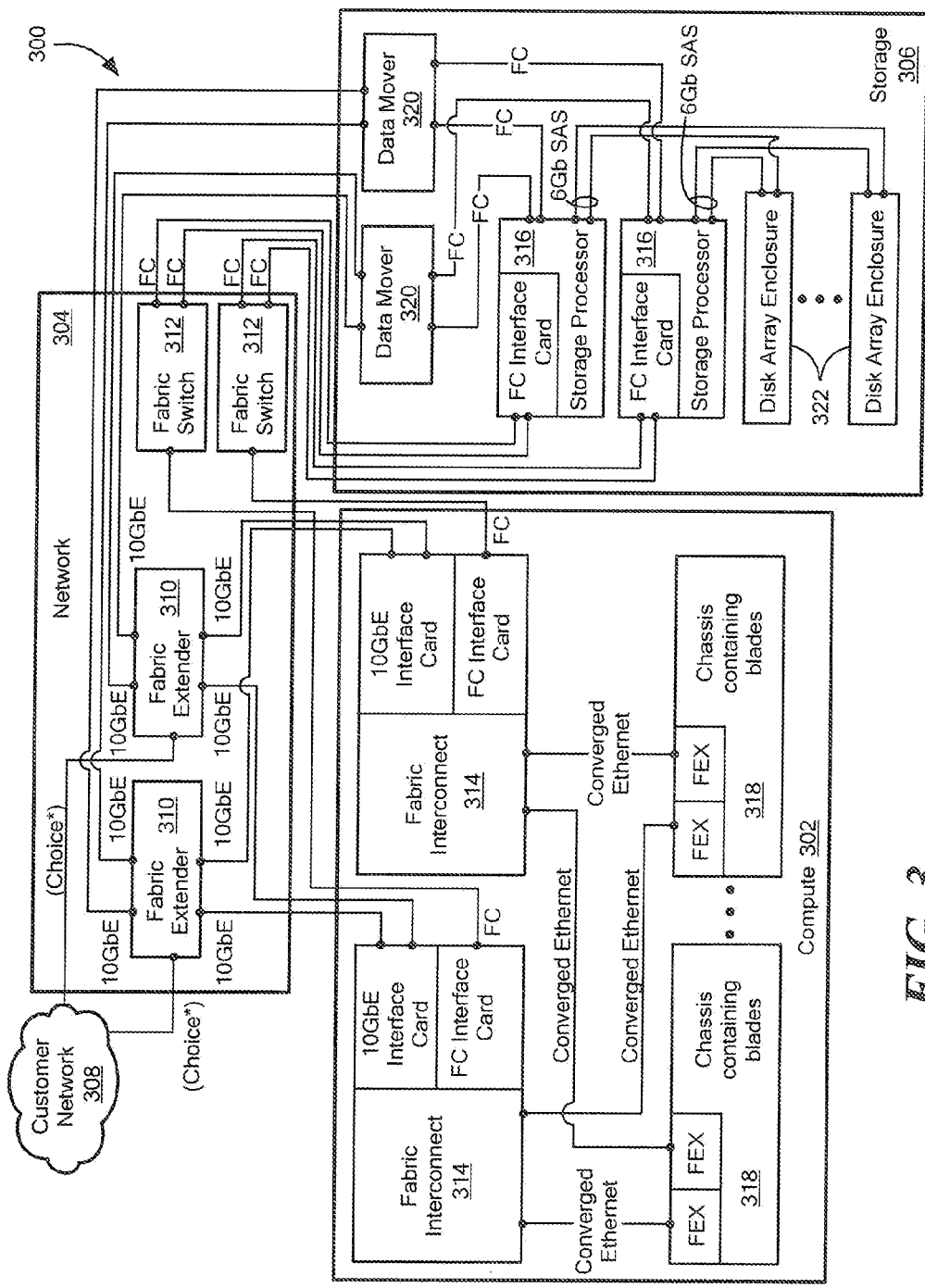
FIG. 3 is a schematic representation showing further detail of the pre-integrated cloud computing system if FIG. 2 including system components.
Figure 4:
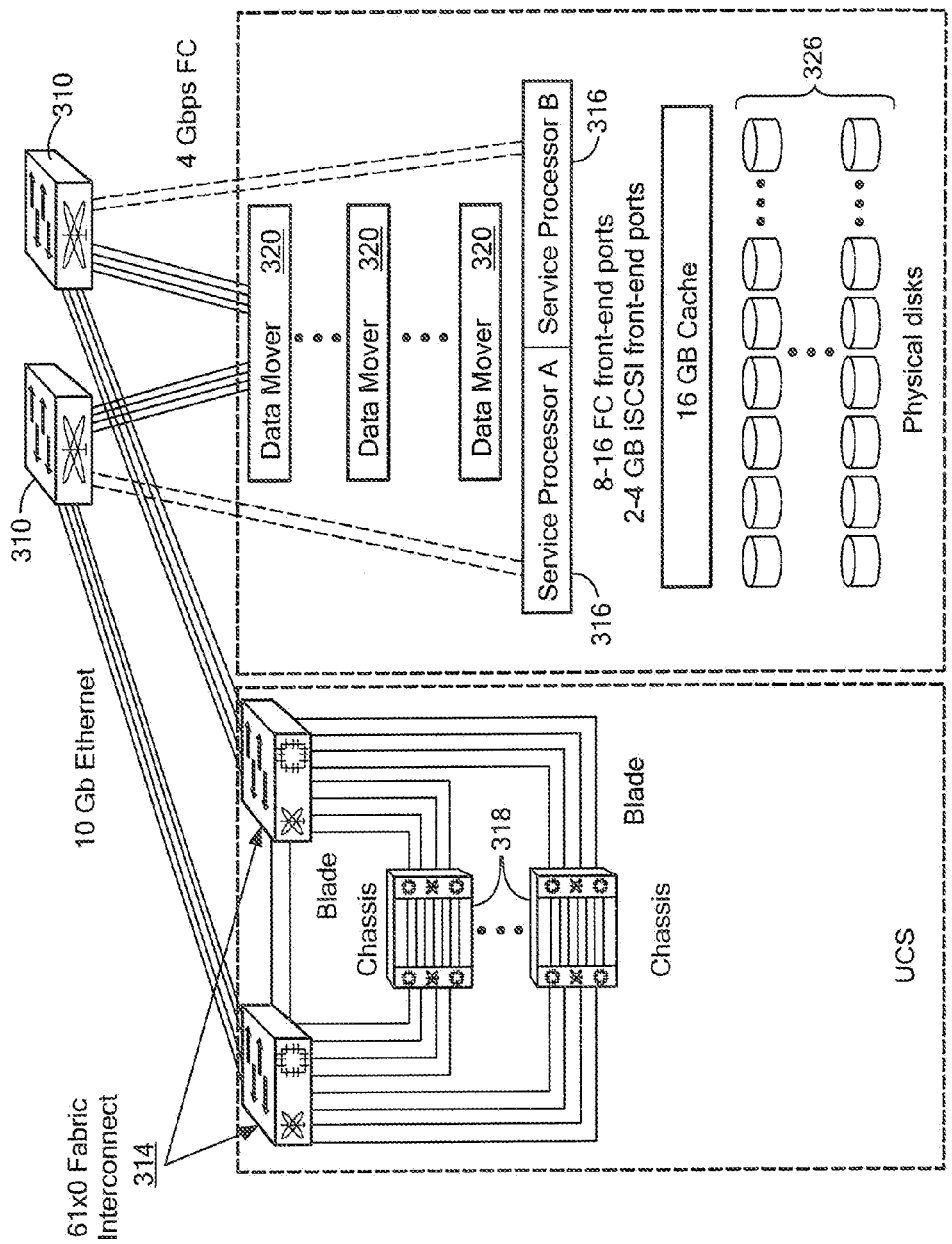
FIG. 4 is a schematic representation showing further detail of a storage layer of the pre integrated cloud computing system of FIG. 3 using NAS for the storage layer.

FIG. 3 shows further detail of an exemplary cloud environment having a compute domain 302, a network domain 304 and a storage domain 306. The network domain 302 is coupled to a customer network 308 in a manner known in the art. The network domain 302 includes switches 310 coupled to the customer network 308. The network domain 302 also includes multilayer fabric switches 312 coupled to fabric interconnects 314 in the compute domain 302 and to storage processors 316 in the storage domain 306. The fabric interconnects 314 are coupled to blade server chassis 318 containing blades. Data movers 320 in the storage domain 306 are coupled between the storage processors 316 and the switches 310 in the network domain. Disk array enclosures 322 are coupled to the storage processors 316. FIG. 4 shows interconnections for a system similar to that shown in FIG. 3 with physical disks 326. In the illustrated embodiment, the storage layer includes 8 to 16 front end fibre channel ports and 2-4 GB iSCSI front end ports.

It is understood that a variety of other configurations having different interconnections and storage configuration can be provided to meet the needs of a particular application.

The management layer can include a number of applications to perform various functions for overall control, configuration, etc of the various platform components. A management application can be provided as the Unified Computing System (UCS) Manager by Cisco. It is understood that the blade chassis and fabric interconnection can be considered part of the UCS. Another management application can include a management interface, such as EMC UNISPHERE, to provide a flexible, integrated experience for managing existing storage systems, such as CLARHON and CELERRA storage devices from EMC, A further management application includes a platform element manager, such as Unified Infrastructure Manager (UIM) by EMC, for managing the configuration, provisioning, and compliance of the platform.

Figure 5:
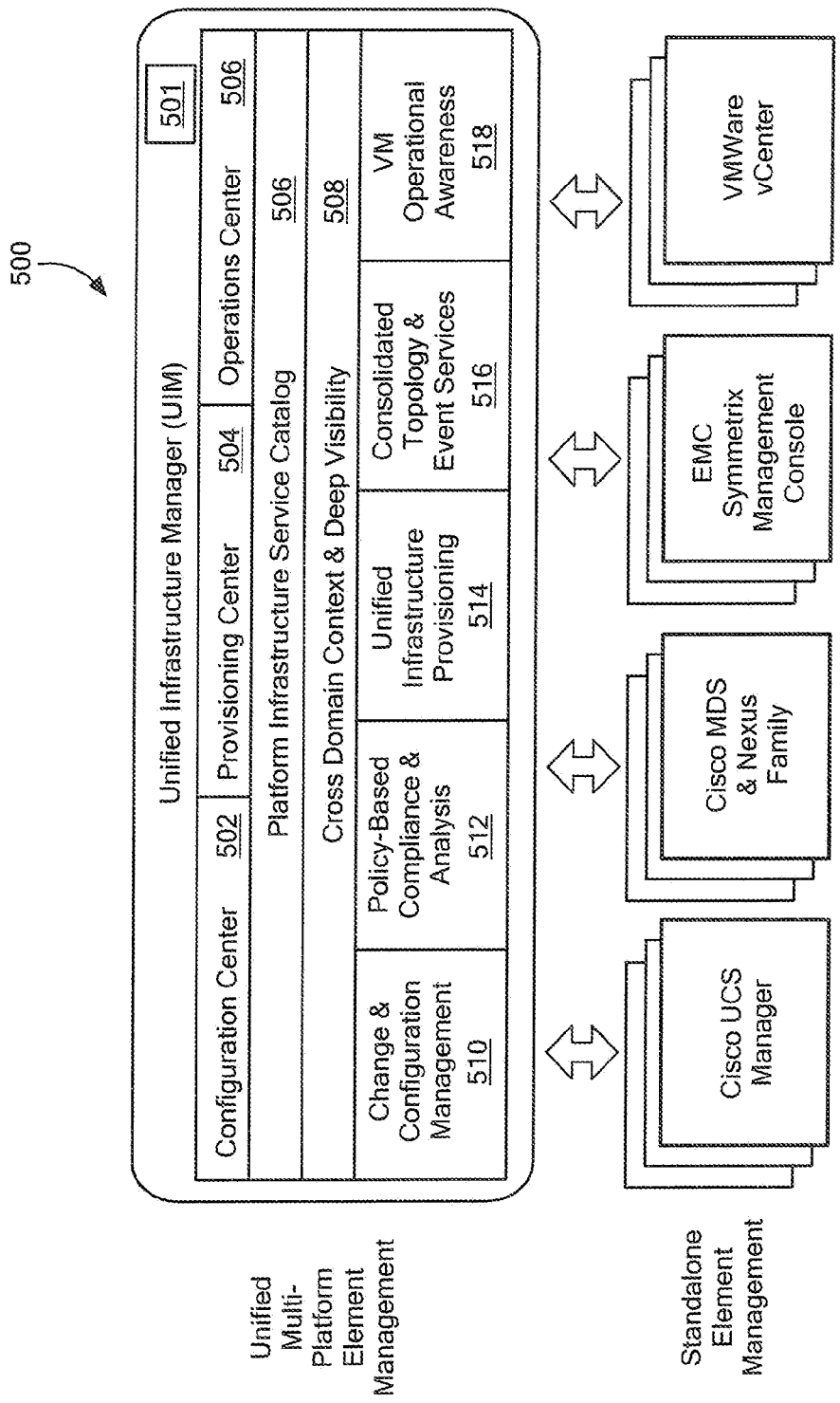
FIG. 5 is a schematic representation of a unified infrastructure manager (UIM) module showing component layering or stack.

FIG. 5 shows an exemplary unified infrastructure manager 500 having a risk redundancy module 501 in accordance with exemplary embodiments of the invention. In one embodiment, the unified infrastructure manager 500 includes a configuration center module 502, a provisioning center module 504, and an operations center module 506. Below these modules, is a platform infrastructure service catalog 506 and a cross domain context and visibility module 508.

The unified infrastructure manager 500 further includes a change and configuration management module 510, a policy-based compliance and analysis module 512, a unified infrastructure provisioning module 514, a consolidation topology and event service module 516, and an operational awareness module 518. The various modules interact with platform elements, such as devices in compute, network and storage domains, and other management applications.

The unified infrastructure manager 500 performs platform deployment by abstracting the overall provisioning aspect of the platform(s) and offering granular access to platform components for trouble shooting and fault management.

It is understood that various vendor specific terminology, product name, jargon, etc., may be used herein. It is further understood that such vendor specific information is used to facilitate an understanding of embodiments of the invention and should not limit the invention in any way. Any specific vendor information should be construed mean a generic product, function, or module.

Some exemplary items are set forth below. It is understood that one of ordinary skill in the art is familiar with the generic architecture and functionality of a vendor specific terms.

UIM/Provisioning or UIM/P: EMC Unified Infrastructure Management/Provisioning that provides simplified management for VCE VBLOCK by managing the components of VBLOCK platforms as a single entity and easily define and create infrastructure service profiles to match business requirements.

Cisco UCS: Cisco Unified Computing System.

VMWARE VSPHERE: A virtualization platform for building cloud infrastructures

ESX/ESXi: An enterprise-level computer virtualization product offered by VMware.

VM: Virtual Machine

VBLOCK: A pre-architected and pre-qualified environment for virtualization at scale: storage, fabric, compute, hypervisor, management and security.

In one aspect of the invention, a cloud computing system includes risk quantification by evaluating the failure probability of a service or application in a Vblock, for example. The failure probability is converted into a risk index of scale 0 to 10, for example, to enable a user to easily asses the risk level. In one particular embodiment, a value of 5.5 indicates a failure probability between $10^{-5}$ (a five-9s quality) and $10^{-6}$ (a six-9s quality).

With this arrangement, a risk index renders the redundancy in each domain measurable and comparable, thereby helping balance resources across domains. In addition, a normalized risk index can be used as a health indication for the Vblock, service or its application. Also, risk information can be used to provide an effective way to evaluate the severity of a failure, which can be measured as the change to the risk index associated with a failure.

Figure 6:
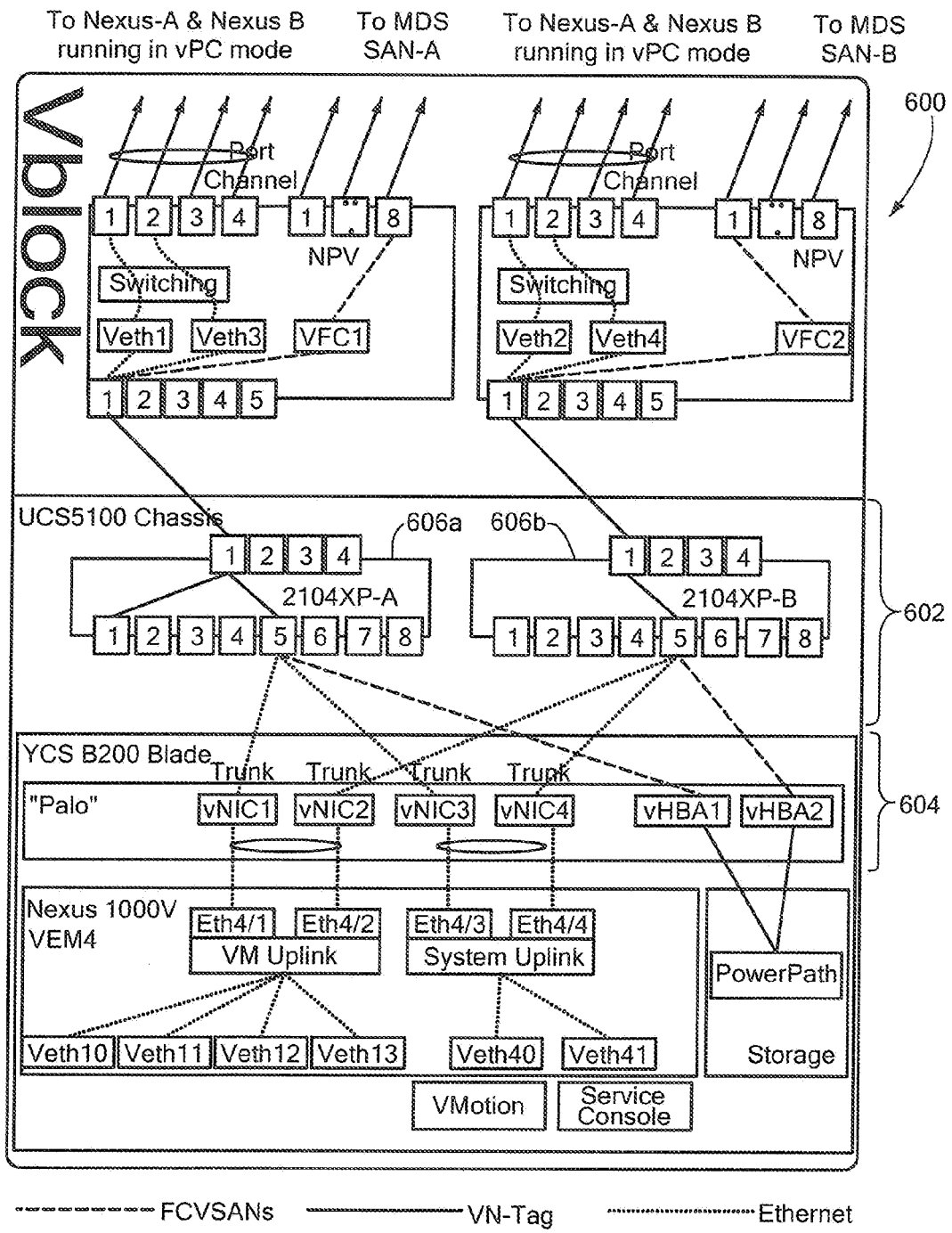
FIG. 6 is a schematic representation of an exemplary cloud system having redundancy.

FIG. 6 shows an exemplary system 100, such as a Vblock, having redundancy risk evaluation in accordance with exemplary embodiments of the invention. The system 100 includes physical and virtual redundancy in each domain. As can be seen, the UCS service VMs are running on server blades 604, each of which is connected to first and second fabrics 6060. If one of the fabrics 606a,b fails, or a fabric port fails, the availability of the services running on the blades 604 is not affected as long as the other fabric is functioning.

There are multiple technologies used to protect a storage volume from being unavailable due to disk failures. For example, Redundant Array Inexpensive Disk (RAID) technology replicates data using an n+1 coding such that the data can be computed given any of the n instances. This ensures the volume survives with a single disk failure.

In the case where a disk fails and the volumes lose their n+1 protection, the failed disk will be replaced by a hot spare if one is available. The process of building the hot spare from the remaining n disks can take a significant amount of time. However, only if another disk fails during this period of time are the volumes affected.

Figure 7:
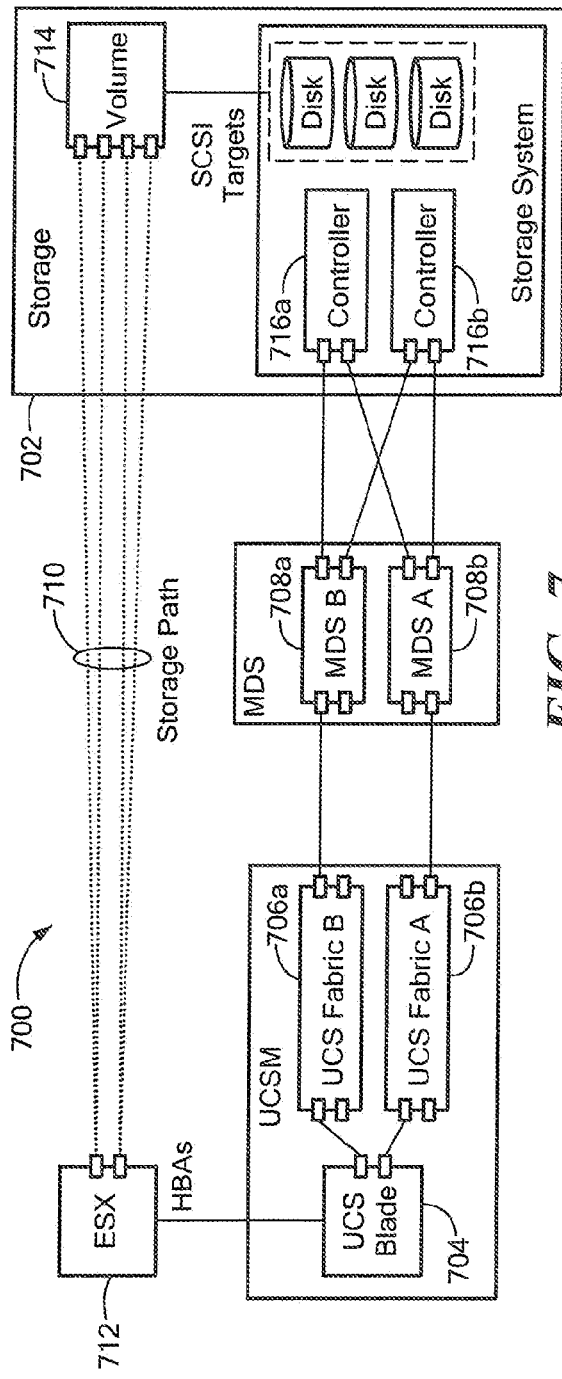
FIG. 7 is a schematic representation of a portion of a pre-integrated cloud computing system with redundancy.

FIG. 7 shows a simplified block diagram of cloud system 700 having a storage layer 702 coupled to a UCS blade 704 via fabric interconnects 706a,b and SAN switches 708a,b. A storage path 710 is for storage traffic between an ESX 712 and a storage volume 714.

There are multiple storage paths between the ESX 712 and the storage volume 714. In the illustrative embodiment, there are four storage paths between the ESX 712 and the storage volume 714. Each storage path goes through UCSBlade 704 to UCS Fabric 706 to MDS 708 to StorageController 716, via three stages of cables. As can be seen each cable stage provides redundancy between the components.

In an exemplary embodiment, a cluster of ESX servers is formed to deliver compute services. A cluster is equipped with High Availability (HA) capability to mitigate the effects of ESX failures. If an ESX server fails, VMs running at that ESX will be restarted in a different ESX server to continue service. It is possible that, after some ESX server fails, the overall computing power of a cluster can no longer meet the configured needs. In this case, an overcommitted warning is raised.

In a UIM service model, infrastructure resources of multiple domains are treated as a single service. A UIM service is a collection of resources in each of the compute, network and storage domains. Logically, a UIM service includes an exclusive set of ESXs, an exclusive set of storage volumes, and a set of network resources shared with other services in the same \'block.

A service is considered to be at risk if (storage) disks are down causing any storage volume to fail and lose data; (network) storage paths are down causing any storage volume to become inaccessible; or a (compute) ESX is down causing the HA-enabled cluster to become overcommitted. Thus, the failure probability of a service is the sum of the failure probability in each domain.

Figure 8:
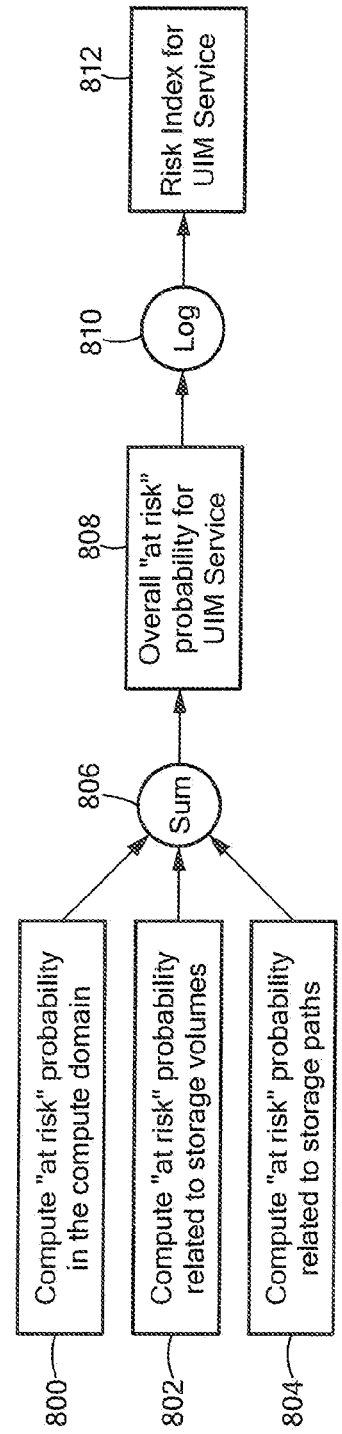
FIG. 8 is a representation of processing to compute at risk probabilities and an overall risk index.

FIG. 8 shows an exemplary at risk evaluation in accordance with exemplary embodiments of the invention. In step 800, the at risk probability is computed for the compute domain. In step 802, the at risk probability is computed for the storage volumes in the storage domain. In step 804, the at risk probability is computed for storage paths.

In step 806, the at risk probabilities for the compute domain 800, the storage volumes 802, and the storage paths 804 are summed to determine an overall at risk probability for the UIM service in step 808. In step 810, the logarithm of the overall at risk probability is taken to generate a risk index for the UIM service in step 812. Exemplary at risk) probability computations for the compute, storage volumes, and storage paths are set forth below.

In an exemplary embodiment, the probability that a service is at risk in the storage domain is given by:

$$\sum_{i=1}^{v} \binom{n_i}{k_i+1} \cdot r \cdot \left(\frac{mr}{365 \times 24 \times 60}\right)^{k_i}$$

where v is the number of storage volumes used by this service, $n_i$ is the number of disks in each of the storage volumes, k is the number of disks that could fail in the storage volume without data loss. $0 \leq k_i \leq n_i$, r is the annual failure rate of a disk, and in is the number of minutes it takes to convert a hot spare to a contributing disk of a storage volume.

There is considerable information relating to the annual failure rate for disk drives, which serves as the basis to estimate the failure rate r for storage volumes. Depending on which RAID technology is used, the volume failure rate without hot spare can vary. For example, the failure rate is $n(n-1)r^2$ for RAID5-based volumes that are tolerant of a single disk failure.

Assume that a hot spare takes in minutes to build. A storage volume will fail only if other k disks fail during this period of time. The chance that a disk fails in an m-minute interval is:

$$\frac{m \cdot r}{265 * 24 * 60}$$

For any combination of (k+1) disks in a storage volume, the probability that they all fail within an m-minute interval in a given year is then given by:

$$r \cdot \left(\frac{m \cdot r}{265 * 24 * 60}\right)^k$$

In a storage volume of n disks, there are $$\binom{n}{k+1}$$

combinations of (k+1) disks. Therefore, we have the annual failure rate of a storage volume without hot spare as:

$$\binom{n}{k+1} \cdot r \cdot \left(\frac{m \cdot r}{265 * 24 * 60}\right)^k$$

If n=5, k=1, m=5, the annual failure probability of a storage volume will be 1.42e-6, or 1.4 in one million. For a service with four storage volumes, the overall at risk probability with storage volumes is 5.68e-6.

In one embodiment, the probability that a service is at risk in the storage path domain is given by:

$$b \cdot v \cdot \sum_{i=1}^{s} p_i \cdot \left(\frac{p_i \cdot h}{365 \times 24}\right)^{c_i - 1}$$

where v is the number of storage volumes used by this service, b is the number of ESX servers (blades) used by this service, $c_i$ is the number of cables in each of the storage stages, $p_i$ is the annual failure rate of a cable in stage i, and h is the number of hours it takes to replace a defected cable.

An ESX will lose its connectivity to a storage volume if the cables in one of the stages are all down. Suppose that a storage path includes s stages in tandem. In stage i, there are a group of $c_i$ cables. Denote, the annual failure rate $p_i$ of a cable, and suppose it on average takes h hours to physically replace a cable. The probability that all cables in stage i are down within the same h hours in a given year is:

$$p_i \cdot \left(\frac{p_i \cdot h}{365 \times 24}\right)^{c_i - 1}$$

Then, the overall annual probability that an ESX will lose connectivity to a storage volume is given by:

$$\sum_{i=1}^{s} p_i \cdot \left(\frac{p_i \cdot h}{365 \times 24}\right)^{c_i - 1}$$

In an exemplary Vblock environment, s=3, $c_1$=2, $c_2$=2, $c_3$=4. If all $p_1$ is 0.005 and h is 3 hours, then the annual rate that an ESX will lose connectivity with a storage volume is 2.56e-8. For a service with eight blade servers and four storage volumes, there are thirty-two ESX-Volume combinations. The overall risk probability related to all the storage paths is approximately 2.56e-8×32=8.22e-7.

In one embodiment, the probability that a service is at risk in the compute domain, i.e. the compute cluster becomes overcommitted, is given by:

$$\binom{b}{a+1} \cdot q \cdot \left(\frac{q \cdot d}{365}\right)^a$$

where b is the number of ESX servers (blades) used by this service, a is the failover tolerate, i.e. the number of servers that could fail without putting the compute cluster service into overcommitted state, q is the annual failure rate of a blade/ESX server, and d is the number of days it takes to replace a blade. For an 8-ESX cluster with failover tolerate set to 1, a=1 and b=8. If q=0.2% and d=2, then the probability the service is at risk in the compute domain is about 6.12e-7.

In an exemplary embodiment, the raw risk data is manipulated to enable a user to more easily understand the risk information. In one embodiment, the risk index is obtained by taking the logarithm of the at risk probability. The larger the index, the better assurance the service is given. Table I below summarizes previous calculations of the at risk probability in each domain and the overall risk index for a UIM service.
Table 1

TABLE 1

| Domain | Compute | Storage | Network (Storage Path) |
|---|---|---|---|
| Resources & Configuration | 8-ESX cluster; Host failover tolerate set to 1 | 4 volumes from a 4 + 1 raid-5 group | 4 storage paths between an ESX and a volume |
| Annual Failure Rate | Blade/ESX - 0.002 | Disk - 0.1 | Cable - 0.005 |
| Recovery time | 2 days | 5 minutes | 3 hours |
| At-risk probability | 6.12e-7 | 5.68e-6 | 8.22e-7 |
| Risk index | Overall failure probability: 6.12e-7 + 5.68e-6 + 8.22e-7 = 7.11e-6  Risk index = 5.15 | | |

By comparing the at risk probability at each domain, it can be seen in this example that storage is the most at risk domain. Given this information, it may be worth considering ways to improve and/or balance the risk.

In a system where there are multiple failures present, one would want to know the severity of each failure, based on which the priority of remediation can be defined. For example, assume there are three failures in the system: a blade fails, a disk fails, and a LJCS-MI)S cable is down. In an exemplary embodiment, the risk indexes can be used to determine which failure should be addressed first.

Table 2 below illustrates a situation in which three failures are present. It recalculates the at risk probability in each domain after the failure, and evaluates the difference in terms of the risk index in that domain. The bigger the difference in risk index, the more severe the failure is. In this example, the disk failure introduces the biggest risk.

Table 2

TABLE 2

| Domain | Compute | Storage | Network (Storage Path) |
|---|---|---|---|
| Original At-risk probability | 6.12e−7 | 5.68e−6 | 8.22e−7 |
| Equivalent Risk Index | 6.21 | 5.24 | 6.09 |
| Example failure scenario | A blade fails | A disk fails | A cable between UCS and MDS is down, affecting 4 ESX-volume combinations |
| New at-risk probability | 0.014 | 0.344 | 0.02 |
| New Risk Index | 1.85 | 0.46 | 1.70 |
| Change in Risk Index (=Impact) | 6.21 − 1.85 = 4.36 | 5.24 − 0.46 = 4.78 | 6.09 − 1.70 = 4.39 |

Figure 9:
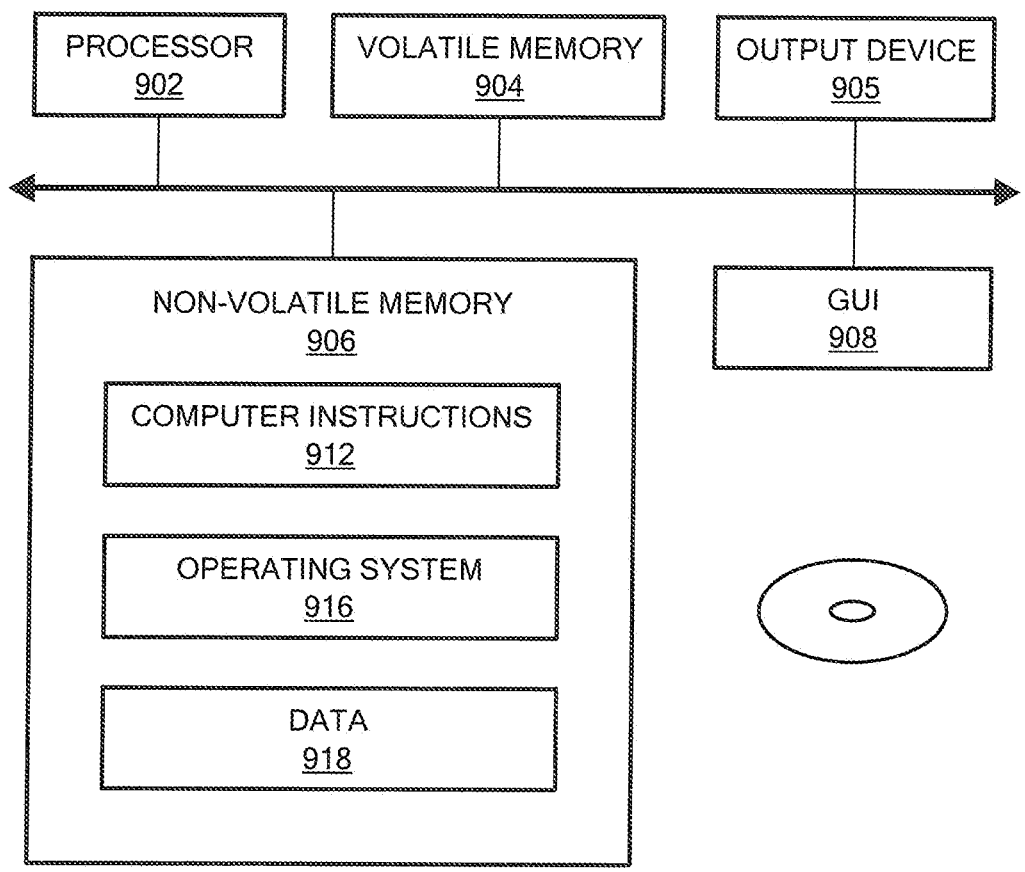
FIG. 9 is a schematic representation of an exemplary computer that can perform at least some of the processing described herein.

FIG. 9 shows an exemplary computer that can perform at least a part of the processing described herein. A computer includes a processor 902, a volatile memory 904, an output device 905, a non-volatile memory 906 (e.g., hard disk), and a graphical user interface (GUI) 908 (e.g., a mouse, a keyboard, a display, for example). The non-volatile memory 906 stores computer instructions 912, an operating system 916 and data 918, for example.

In one example, the computer instructions 912 are executed by the processor 902 out of volatile memory 904 to perform all or part of the processing described above. An article 919 can comprise a machine-readable medium that stores executable instructions causing a machine to perform any portion of the processing described herein.

Processing is not limited to use with the hardware and software described herein and may find applicability in any computing or processing environment and with any type of machine or set of machines that is capable of running a computer program. Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Programs may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processing.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method, comprising:
   in a pre-integrated cloud computing system having a compute domain, a network domain, a storage domain, a virtual layer and a management layer, to provide services, the cloud storage system providing redundancy,
   determining an at risk probability in the compute domain and a first risk index for the compute domain from the at risk probability in the compute domain;
   determining an at risk probability for storage volumes in the storage domain and a second risk index for the storage domain from the at risk probability in the storage domain;
   determining an at risk probability for storage paths to the storage domain from the compute domain and a third risk index for the storage paths from the at risk probability of the storage paths;
   determining an overall at risk probability for a first one of the services using system resources and an overall risk index for the first one of the services from the overall risk probability; and
   determining a revised overall risk index after at least two component failures in at least two of the compute domain, storage domain, and storage paths to assist a user in selecting a first one of the at least two component failures to fix first.

2. The method according to claim 1, further including using a logarithm to generate the overall risk index.

3. The method according to claim 1, wherein the at risk probability for the compute domain is derived from a number of blades used by the first one of the services, a failover rate relating to a number of servers that can fail without putting a compute cluster service into an overcommitted state, an annual failure rate for the blades used by the first one of the services, and an amount of time to replace one of the blades used by the first one of the services.

4. The method according to claim 1, wherein the at risk probability for the storage volumes is derived from a number of storage volumes used by the first one of the services, a number of disks in the storage volumes, a number of disks that can fail in the storage volumes without data loss, an annual disk failure rate, and an amount of time needed to convert a hot spare disk to a contributing disk of the storage volume.

5. The method according to claim 1, wherein the at risk probability for the storage paths is derived from a number of storage volumes used by the first one of the services, a number of blades used by the first one of the services, a number of cables used by the storage volumes, an annual failure rate for the cables, and an amount of time to replace a failed one of the cables.

6. An article, comprising:
   a non-transitory computer readable medium containing stored instructions that enable a machine to perform, in a pre-integrated cloud computing system having a compute domain, a network domain, a storage domain, a virtual layer and a management layer, to provide services, the cloud storage system providing redundancy:
determine an at risk probability in the compute domain and a first risk index for the compute domain from the at risk probability in the compute domain;
determine an at risk probability for storage volumes in the storage domain and a second risk index for the storage domain from the at risk probability in the storage domain;
determine an at risk probability for storage paths to the storage domain from the compute domain and a third risk index for the storage paths from the at risk probability of the storage paths;
determine an overall at risk probability for a first one of the services using system resources and an overall risk index for the first one of the services from the overall risk probability; and
determine a revised overall risk index after at least two component failures in at least two of the compute domain, storage domain, and storage paths to assist a user in selecting a first one of the at least two component failures to fix first.

7. The article according to claim 6, further including instructions for using a logarithm to generate the overall risk index.

8. The article according to claim 6, wherein the at risk probability for the compute domain is derived from a number of blades used by the first one of the services, a failover rate relating to a number of servers that can fail without putting a compute cluster service into an overcommitted state, an annual failure rate for the blades used by the first one of the services, and an amount of time to replace one of the blades used by the first one of the services.

9. The article according to claim 6, wherein the at risk probability for the storage volumes is derived from a number of storage volumes used by the first one of the services, a number of disks in the storage volumes, a number of disks that can fail in the storage volumes without data loss, an annual disk failure rate, and an amount of time needed to convert a hot spare disk to a contributing disk of the storage volume.

10. The article according to claim 6, wherein the at risk probability for the storage paths is derived from a number of storage volumes used by the first one of the services, a number of blades used by the first one of the services, a number of cables used by the storage volumes, an annual failure rate for the cables, and an amount of time to replace a failed one of the cables.

11. A pre-integrated cloud computing system having a compute domain, a network domain, a storage domain, a virtual layer and a management layer, to provide services, the cloud storage system providing redundancy, comprising:
a processor; and
a memory containing instructions to enable the processor to:
determine an at risk probability in the compute domain and a first risk index for the compute domain from the at risk probability in the compute domain;
determine an at risk probability for storage volumes in the storage domain and a second risk index for the storage domain from the at risk probability in the storage domain;
determine an at risk probability for storage paths to the storage domain from the compute domain and a third risk index for the storage paths from the at risk probability of the storage paths;
determine an overall at risk probability for a first one of the services using system resources and an overall risk index for the first one of the services from the overall risk probability; and
determine a revised overall risk index after at least two component failures in at least two of the compute domain, storage domain, and storage paths to assist a user in selecting a first one of the at least two component failures to fix first.

12. The system according to claim 11, wherein the processor and memory are further configured to use a logarithm to generate the overall risk index.

13. The system according to claim 11, wherein the at risk probability for the compute domain is derived from a number of blades used by the first one of the services, a failover rate relating to a number of servers that can fail without putting a compute cluster service into an overcommitted state, an annual failure rate for the blades used by the first one of the services, and an amount of time to replace one of the blades used by the first one of the services.

14. The system according to claim 11, wherein the at risk probability for the storage volumes is derived from a number of storage volumes used by the first one of the services, a number of disks in the storage volumes, a number of disks that can fail in the storage volumes without data loss, an annual disk failure rate, and an amount of time needed to convert a hot spare disk to a contributing disk of the storage volume.

15. The system according to claim 11, wherein the at risk probability for the storage paths is derived from a number of storage volumes used by the first one of the services, a number of blades used by the first one of the services, a number of cables used by the storage volumes, an annual failure rate for the cables, and an amount of time to replace a failed one of the cables.

* * * * *